Nov. 29, 1927.
W. P. REAVES
1,650,768
EYE TESTING APPARATUS
Filed Sept. 26, 1925
7 Sheets-Sheet 2
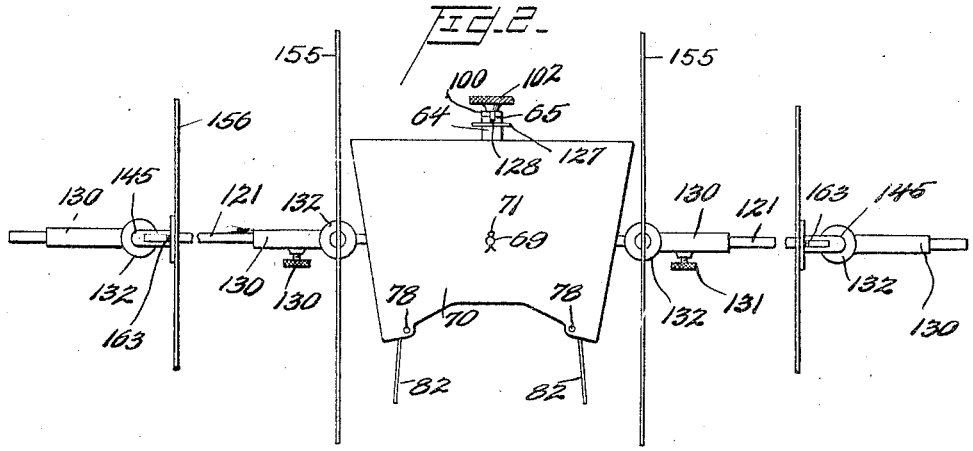
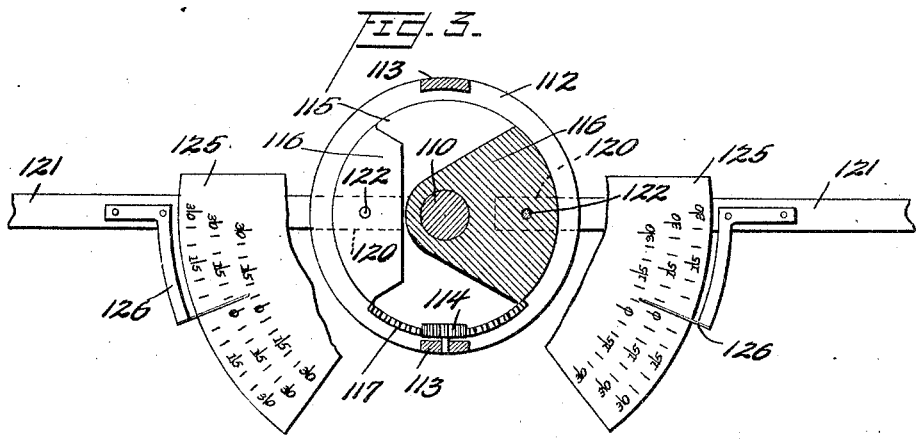
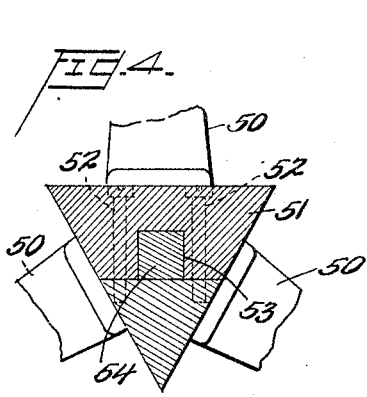
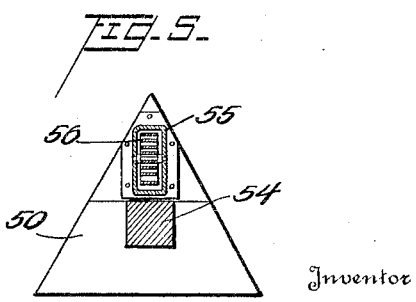
Inventor
Wm. P. Reaves,
By Watson, Coit, Moue & Grindle,
Attorney

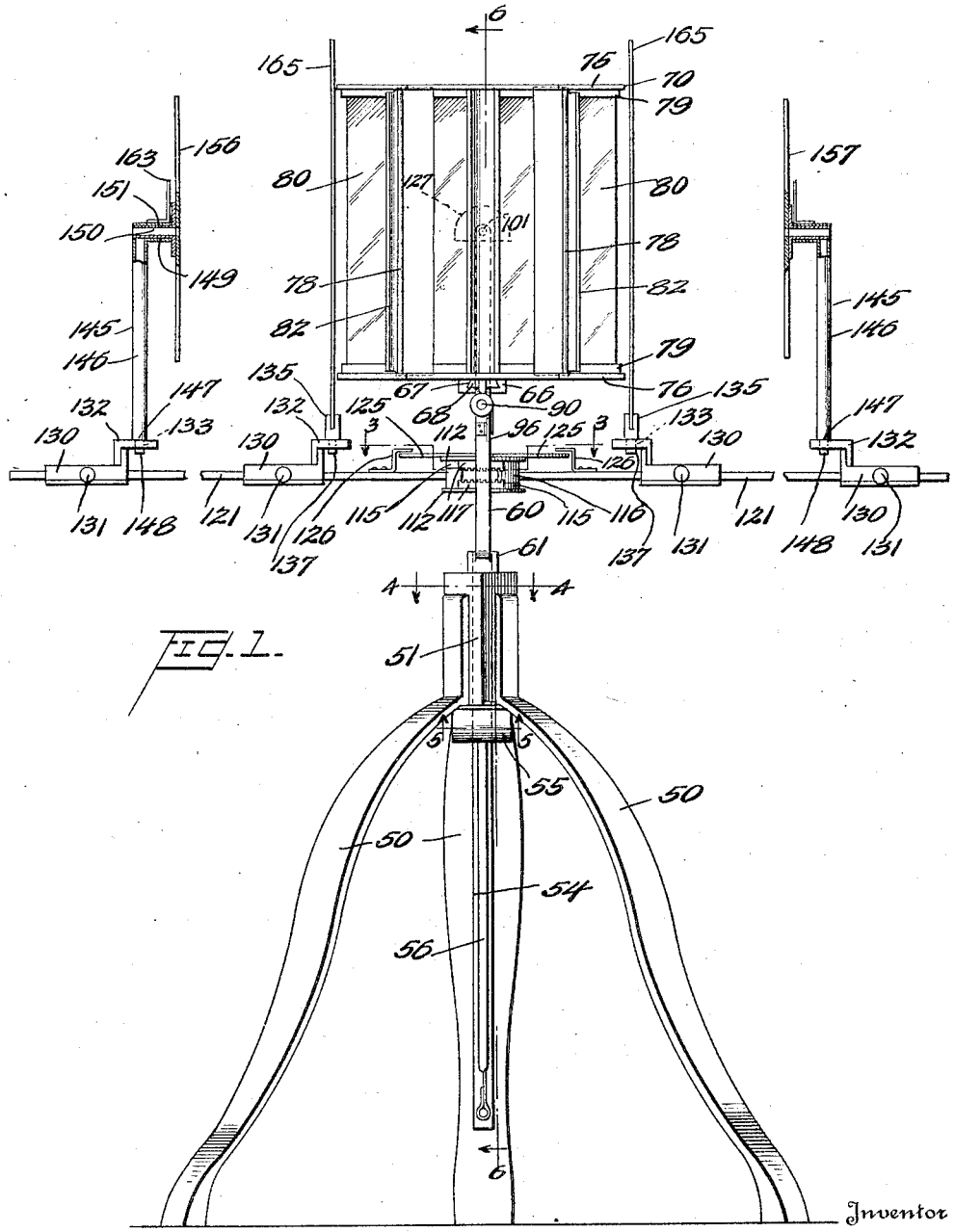

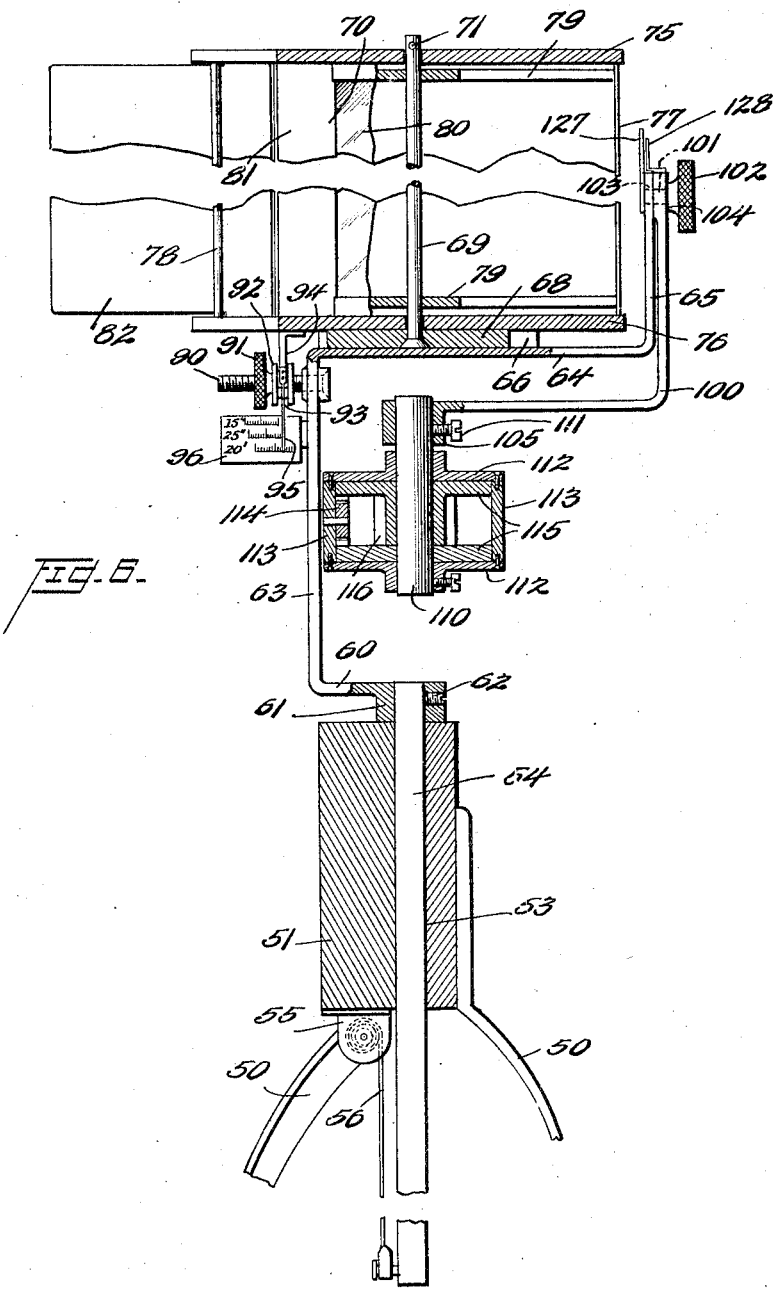

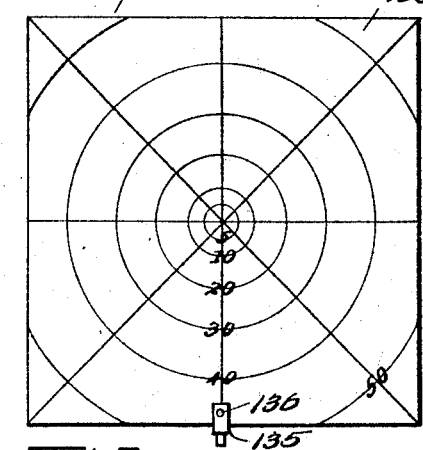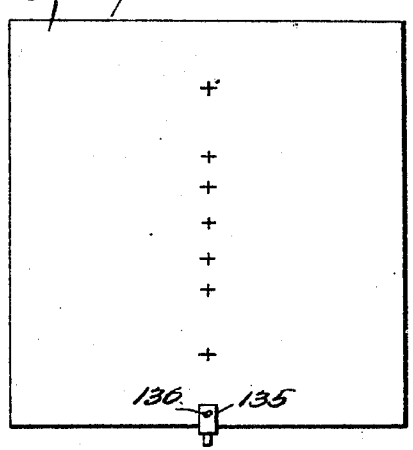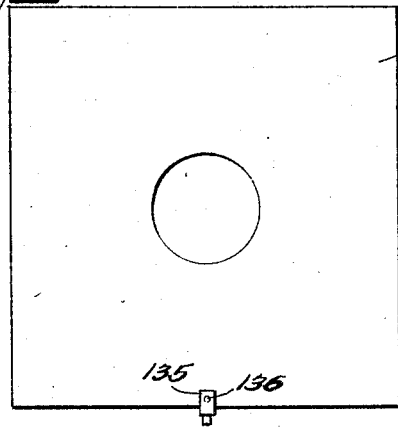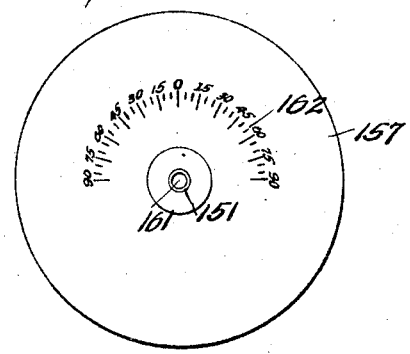

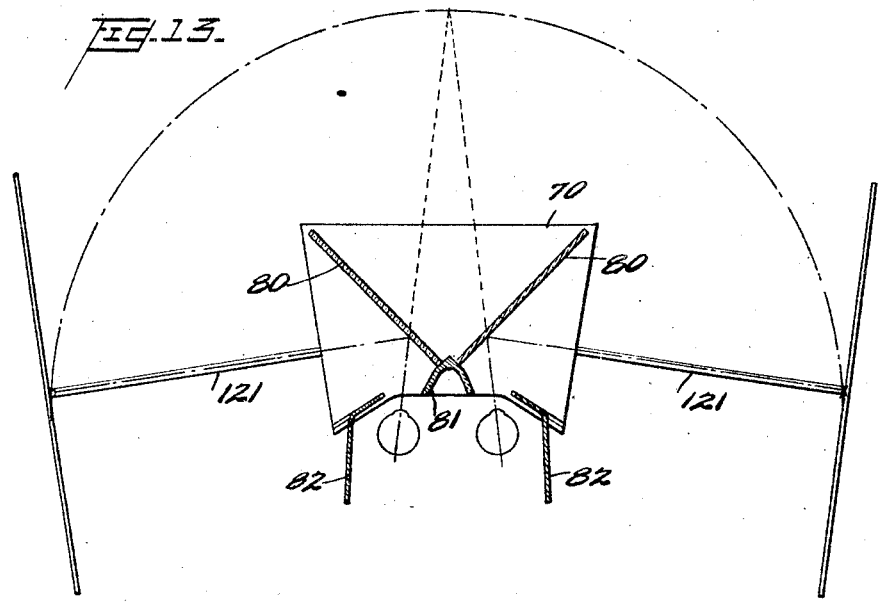
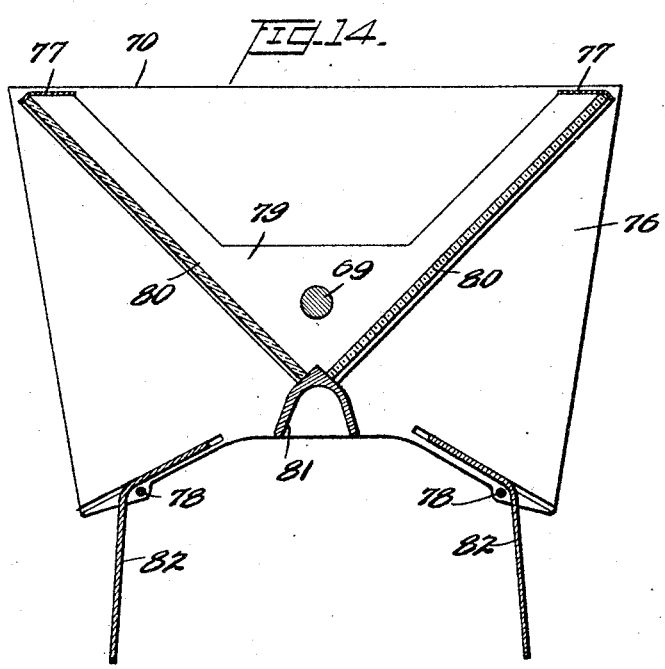

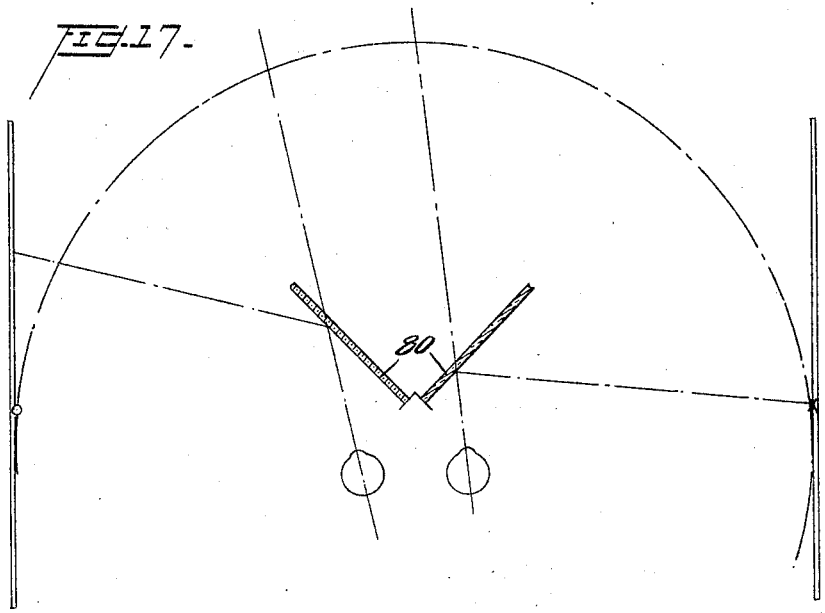
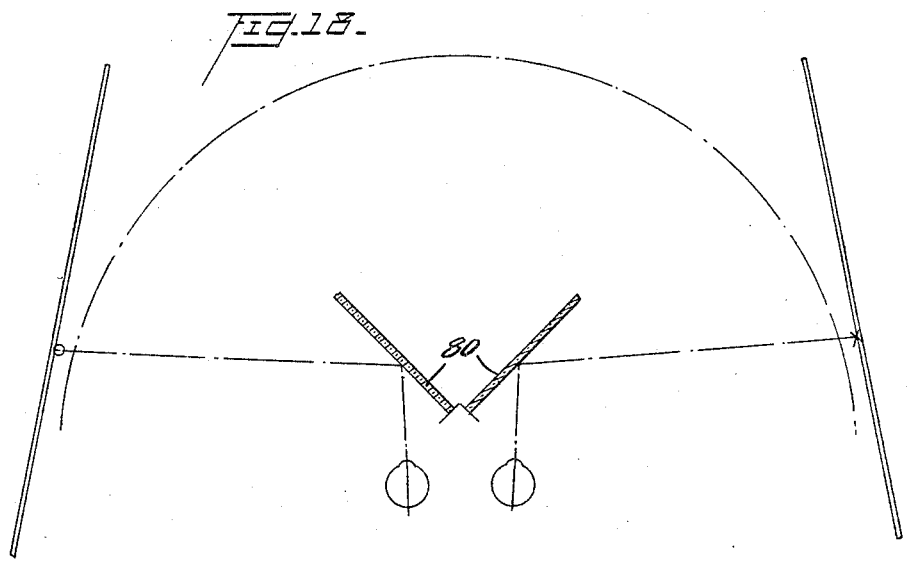

Patented Nov. 29, 1927.

1,650,768

UNITED STATES PATENT OFFICE.

WILLIAM PERRY REAVES, OF GREENSBORO, NORTH CAROLINA.

EYE-TESTING APPARATUS.

Application filed September 26, 1925. Serial No. 58,767.

This invention relates to eye testing apparatus, and relates more particularly to eye testing apparatus of the stereo-binocular type.

It is an object of my invention to provide an eye testing apparatus which is adapted to perform the combined functions of a perimeter, a phorometer and a clinoscope.

It is a further object of my invention to provide an instrument of this character which dispenses with the necessity of employing any prisms, which are unsatisfactory in that they are both expensive and difficult to accurately adjust.

It is a still further object of my invention to provide an apparatus of this character which is extremely accurate and, at the same time, simple in construction and operation.

Other objects and advantages of my invention will be apparent from the following description taken in conjunction with the accompanying drawings, which form a part of this specification, and in which:

Fig. 1 is a front elevation of an eye testing apparatus according to my invention;

Fig. 2 is a top plan view of the same;

Fig. 3 is an enlarged fragmentary horizontal section taken on the line 3—3 of Figure 1;

Fig. 4 is a similar view taken on the line 4—4 of Figure 1;

Fig. 5 is a similar view taken on the line 5—5 of Figure 1;

Fig. 6 is an enlarged central vertical section taken on the line 6—6 of Figure 1;

Fig. 7 is a front elevation of a test chart adapted for use with my apparatus;

Fig. 8 is a rear elevation of the same;

Fig. 9 is a front elevation of an apertured screen for use with my apparatus;

Fig. 10 is a front elevation of a rotatable test card having a fixation object for one eye adapted for use with my apparatus;

Fig. 11 is a front elevation of a rotatable test card having a dissimilar fixation object for the other eye designed to be used in conjunction with the card shown in Figure 10;

Fig. 12 is a rear elevation of the cards shown in Figures 10 and 11;

Fig. 13 is a diagrammatic plan view of my apparatus showing the relation of a pair of standard eyes thereto;

Fig. 14 is a horizontal section through the mirror box;

Fig. 17 is a diagrammatic plan view of my apparatus in its normal position, showing the relation of a pair of exotropic eyes thereto; and Fig. 18 is a similar view, showing the relation of the same patient's eyes to the apparatus after the adjustments necessary to secure binocular vision have been made.

Figure 15:
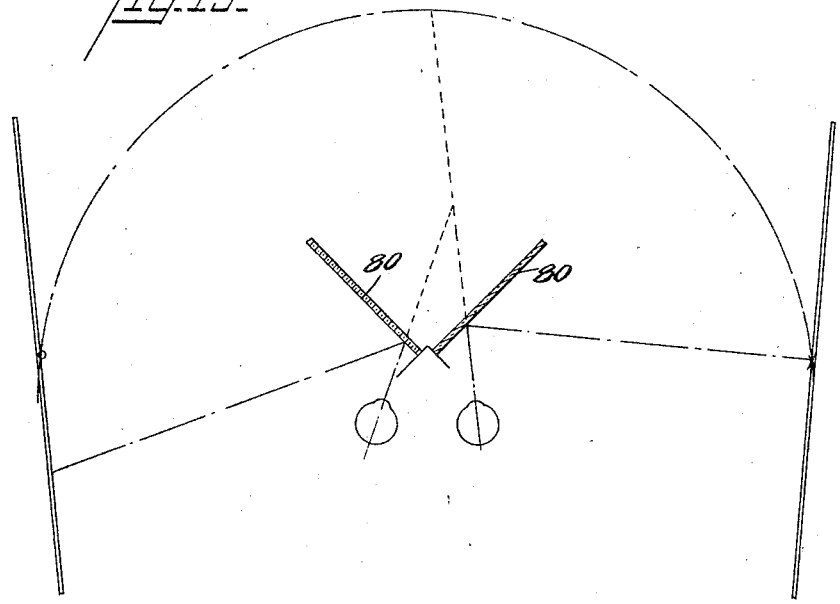
Fig. 15 is a diagrammatic plan view of my apparatus in its normal position, showing the relation of a pair of esotropic eyes thereto before any adjustments are made.

Referring more particularly to the drawings, in which like reference characters denote like parts throughout the several views thereof, three legs 50 support a triangular block 51, which is preferably made in two pieces held together by screws 52, as shown in Figure 4, and is provided with a centrally disposed vertical aperture 53. The aperture 53 is preferably square in cross section, and a square rod 54 is adapted to slide vertically therein. A casing 55, best shown in Figures 5 and 6, is secured to the lower side of the block 51 and encloses a spiral spring 56, somewhat similar to a clock spring, the lower end of which is secured to the rod 54 and which serves to counterbalance the weight of the apparatus.

As shown in Figure 6, a yoke 60 is secured to the upper end of the rod 54 by means of a collar 61 and a set screw 62. The yoke 60 comprises a front or lower vertical portion 63, a horizontal portion 64, and a back or upper vertical portion 65. The horizontal portion 64 has beveled side members 66 secured thereto, so as to form a dovetail slot 67. A bar 68 is beveled so as to fit in the dovetail slot 67, and is adapted to slide horizontally therein. A vertical rod 69 is secured to the bar 68, and a mirror box 70 is rotatably mounted thereon and may be held in place by a cotter pin 71, or other suitable means.

The mirror box 70 comprises a top 75 and a bottom 76, connected together at the rear corners by uprights 77, and near the front corners by vertical rods 78. A pair of right-angled mirror supports 79 are secured to the top 75 and the bottom 76, respectively, and are provided with cooperating grooves in which are mounted two mirrors 80, which make an angle of 90° with each other. A vertical nose piece 81 is positioned adjacent the apex of the right-angled supports 79 near the front center of the mirror box, and may be secured to the top and bottom of the box. The nose piece 81 serves to keep the patient's breath from clouding the mirrors 80, which are preferably silvered on their front surfaces. A pair of eye shields 82, which may be bent to the shape shown in Figure 14, are slidably mounted in cooperating grooves in the top 75 and bottom 76, and may be adjusted to suit the width of the patient's head. The vertical rods 78 are so positioned as to serve as stops to limit the inward movement of the eye shields 82.

A screw 90 is secured to the upper vertical portion 63 of the yoke 60 below the mirror box 70 and has a knurled hand wheel 91 threaded thereon. The hand wheel 91 has an integral extension 92 in which is formed a groove 93, and a bifurcated member 94 secured to the bottom 76 of the mirror box 70 projects into the groove 93. By rotating the hand wheel 91, the mirror box 70 will thus be moved forward or backward. A pointer 95 is secured to the extension 92 and moves over an indicator 96 secured to the yoke 60, for a purpose which will be pointed out hereinafter.

The vertical arm of an L-shaped member 100 is pivotally mounted on a horizontal pin 101 (see Figure 6). The pin 101 has a knurled head 102 at one end and is threaded at the other end so that it may be screwed into a tapped hole 103 in the top of the upper vertical portion 65 of the yoke 60. The member 100 may be freely turned about the pin 101, and held in the desired position by turning the knurled head 102 so as to clamp it between the yoke 60 and a shoulder 104 on the head. The horizontal arm of the member 100 extends below the horizontal portion 64 of the yoke 60, and is provided at its end with a collar 105.

A stud shaft 110 is firmly held in the collar 105 by means of a set screw 111. The stud shaft 110 is arranged immediately below the rod 69 which forms the vertical pivotal axis of the mirror box. A pair of plates 112 are rigidly secured to the shaft 110 and are held apart by relatively narrow spacers 113. One of the spacers 113 has a pinion 114 rotatably mounted thereon. A disk 115 is rotatably mounted on the shaft 110 adjacent each fixed plate 112, and each rotatable disk 115 is provided with a boss 116 thereon. These bosses may be shaped as shown in Figure 3, and are of sufficient thickness to hold the disks 115 in contact with the plates 112. A toothed segment 117 is secured to each disk 115 in position to mesh with the pinion 114.

Each boss 116 is provided with a square hole 120 in the sides thereof, in which one end of a square arm 121 is secured by a pin 122. It will be seen that the arms 121 may be moved forward or backward in unison by pushing on either one of the arms. Moreover both of the arms may be given an oscillating or tilting movement about the horizontal pivot pin 101 by pushing upwardly or downwardly thereon, and may be clamped at the desired angle with the vertical by turning the knurled head 102 of the pin.

It is to be noted that the movement of the arms 121 about the shaft 110 is such that the charts hereafter described are moved so as to remain tangent to the surface of a right circular cylinder whose axis is the axis of shaft 110. Furthermore, the axis of shaft 110 intersects the horizontal axis thru the pin 101, so that the effect of oscillating the shaft 110 about the pin 101 is to tilt this imaginary cylinder. Or, in other words, the charts through all their movements always remain tangent to the surface of a sphere whose center is the point of intersection of the axis of shaft 110 and the horizontal axis thru pin 101. Moreover, the charts are preferably made of such size or supported at such heights that their centers lie in the same plane as the horizontal axis thru pin 101 so that they are tangent to the sphere at their centers. In the above discussion, it is assumed that the charts are mounted at the same distance from the pivotal axis of the arms 121, as will normally be the case, and this distance is, of course, equal to the radii of the cylinder and the sphere above mentioned. In the movement of the charts about the pin 101, they always remain diametrically opposite each other and maintain the same angular relationship, while in the pivotal movement of the arms 121 about the shaft 110, the angle between the planes of the charts is varied.

The horizontal axis thru the pin 101 is the only truly fixed line of the apparatus, and the positions of all the other parts must therefore be defined in relation thereto. It will be seen from a consideration of the drawings that the axis of rotation of the mirror box is vertical and intersects the fixed horizontal axis. Moreover, when the mirror box is moved by rotating the hand wheel 91, it moves toward or from the axis of shaft 110 in a direction parallel to the fixed axis, so that the axis of rotation of the mirror box moves along the fixed horizontal axis and remains perpendicular thereto.

Two dials 125 are secured to the top plate 112 and a pointer 126 is secured to each arm 121, so that the positions of the arms 121 may be indicated directly on the dials 125. As shown in Figure 3, one dial 125 is positioned at each side of the apparatus to cooperate with each pointer 126, the two dials having exactly similar sets of scales, and the pointers 126 are offset somewhat to the front of the apparatus, in order to make it more convenient for the oculist to read the same from a position on either side of the patient. A dial 127 (see Fig. 6) is secured to the upper vertical portion 65 of the yoke 60, and a pointer 128 on the member 100 cooperates therewith to indicate the position of the member 100. The manner of calibrating and using these dials will be described hereafter.

As shown in Figures 1 and 2, two square sleeves 130 are slidably mounted on each of the arms 121 and may be held in any desired position by means of set screws 131. Each sleeve 130 is provided with an integral extension 132 in which is formed a square vertical aperture 133.

It is frequently desirable to mount the test charts or cards for use with my apparatus on the sleeves 130 in fixed relation thereto. Where this is the case, each chart 165 is secured in a slotted member 135 by means of a screw 136 (Figs. 7, 8 and 9). The members 135 are provided with reduced square lower ends 137 which fit removably in the apertures 133 of the sliding sleeves 130. By this construction, the charts may be readily removed and different ones substituted without disturbing the adjustment of the apparatus, and yet the cards will always be accurately centered with respect to the arms 121 and held perpendicular thereto.

At other times it is necessary to mount other cards 156, 157 so that each may be rotated about an axis perpendicular to its plane. For this purpose the cards to be rotated are mounted on stands 145. Each stand 145 comprises a vertical rod 146 provided with a flange 147, immediately below which is a square end portion 148 adapted to fit in the aperture 133 of a sleeve 130. The upper end of the rod 146 is provided with a forward extension 149 having a horizontal cylindrical aperture 150 therein, which goes entirely through the rod in order to permit light to pass therethrough. Each rotatable card has a flanged tubular member 151 secured to the center of the back thereof, which is adapted to rotate in the aperture 150. By providing central apertures in the rotatable cards, there will thus be a small point of light visible when looking at the front of the cards, which is desirable for some purposes.

I will now describe how the apparatus is adjusted for a standard individual having normal eyes which are at once emmetropic, orthophoric and orthotropic, and also how the various scales are calibrated and used. An emmetropic eye is one which will receive parallel rays of light exactly at a focus upon its fovea when in a state of rest without any effort of accommodation. Orthophoria is a condition of perfect muscle balance, equipoise, or binocular equilibrium, and orthotropia is a condition of perfect binocular fixation. I will assume that his interpupillary distance, that is, the distance between the centers of the pupils of his eyes when both eyes are looking straight forward, is two and one-half inches. Test charts provided with similar central marks such as those disclosed in Fig. 7 are mounted on the arms 121 so as to be fifteen inches distant from the standard individual's eyes when he is looking into the mirror box 70. The mirror box is now moved forward or backward by rotating the hand wheel 91, and the arms 121 are swung in a horizontal plane, until he sees the central marks on the two cards fused together to form a single composite image in relief. The apparatus will then be in the position shown diagrammatically in Figure 13, with the arms 121 directly beneath the reflected rays of the incident light rays from the centers of his eyes to the imaginary focal point fifteen inches distant. The point immediately under the pointer 95 on the indicator 96 is then marked in some convenient manner as shown in Figure 6 to indicate "Focal distance 15 inches, Pupillary distance 2½ inches". The points on the dials 125 directly under the pointers 126 are marked "zero" for this same focal distance, as shown in Figure 3, the zero position of the arms 121 being their correct or normal position. This process is then repeated for other focal distances of, say, twenty-five inches and three feet. The scales may be calibrated for any other focal distances desired up to infinity, and those between the values selected may be obtained by interpolation. For practical purposes a focal distance of twenty feet is considered to be the same as having the focal point at infinity. When the focal point is at infinity, the arms 121 will form a straight line, that is, they will be at an angle of 180° to each other.

To complete the calibration of the scales on indicator 96, we must substitute other standard individuals having different interpupillary distances, and mark the positions in which the mirror box must be placed so as to duplicate the conditions illustrated in Figure 13. The zero position of the arms 121 will remain unchanged for the same focal distance regardless of the changes in the interpupillary distance.

After the zero points for the selected focal distances are established on the scales of dials 125, the other graduations are marked in terms of the power of the prisms which would have to be placed before the standard individual's eyes in order for him to obtain a single binocular image of the central marks on the two test charts with the arms in their new position. For example, if a prism having a strength of one centrad or one prism diopter is placed base in before one of his eyes with the apparatus in the position shown in Figure 13, it is obvious that his eyes will no longer focus as there shown, and that he will see two separate images side by side. In order to again establish binocular stereo vision, the arms 121 must be moved forward from their zero position for that focal distance. The new positions of the pointers 126 will therefore be marked 1 centrad, or 1 prism-diopter, which is the substantial equivalent in a different system of prism nomenclature. Other graduations will be established in the same manner for the different focal lengths adopted and for various prism strengths, the prisms being used both base in and base out to calibrate movements of the arms 121 either way from the zero position.

As a practical matter, the calibration might be effected either mechanically or by mathematical calculation. For a mechanical calibration, two lights so constructed as to emit a small pencil of parallel rays may be placed in the positions which the patient's eyes would occupy with respect to the mirror box. The angle of convergence of the two light pencils is then adjusted so that the pencils would cross at the desired focal distance. The mirror box 70 and the arms 121 are then adjusted so that the reflected pencils strike the test charts exactly at their centers, the centers being arranged, of course, in the same horizontal plane as the pencils. The various scales may then be graduated as above described for the focal distance and interpupillary distance employed, the process being repeated for other values and using prisms as above described. A mathematical calibration could be readily worked out given the dimensions of the apparatus.

It will be obvious that for an individual with normal eyes, the L-shaped member 100 should remain always in its vertical position no matter what focal length is employed. Where one eye turns upward or downward relative to the other, however, the member 100 must be rotated about the horizontal pivot pin 101 to secure binocular fixation. This corresponds to placing a prism base up or base down before one eye of the standard individual, and the single scale on the dial 127 is therefore calibrated in this manner.

In making tests to show the muscular balance or imbalance of a patient's eyes, the apparatus is set up as shown in Figures 1 and 2, preferably using screens 155 on the inner pair of sleeves 130, and rotatable test cards 156 and 157 on the outer pair. The screens 155 are shown in detail in Figure 9, and are simply blank cards of even color, preferably black, provided with central apertures through which the patient may look at the test card mounted behind the same. The apertured screens 155 are provided with supporting members 135 as above described. The screens 155 are used only to cut off all external objects from the patient's vision, and are therefore preferably mounted quite close to the mirror box 70. The distance between the screens 155 and the mirror box or the test charts may be left entirely to the discretion of the oculist, and they may be omitted entirely if desired. On the other hand, two screens might be employed for each eye, one near the mirror box and one near the rotatable test charts, or the latter might be mounted directly in the central apertures of the outer pair of screens, thereby eliminating the stands 145.

The test cards 156 and 157, shown in detail in Figures 10 and 11, respectively, are preferably circular and are provided with unlike objects. On the card 156 three lines 158 of equal length are drawn extending radially from the center so as to form a T. A single line 160 of the same length is drawn on the card 157 extending radially from its center. The cards 156 and 157 may both be provided with small central apertures 161. In its normal position, the card 156 is mounted on its stand 145 so that the head of the T formed by the lines 158 is horizontal and its stem extends vertically downward, while the card 157 is mounted so that the line 160 extends vertically upward. The back of each of these test cards is provided with a scale 162 of the protractor type with the zero mark corresponding to the normal position of the card. Pointers 163 may be provided on the stands 145 to cooperate with these scales. It will be seen that when the cards are in their normal or zero positions, and the apparatus is in other respects adjusted for normal eyes, the standard individual will see the unlike objects on the two cards as a single composite image in the form of a cross. Because unlike objects are provided for the two eyes, there is no unconscious or involuntary attempt on the part of the patient to bring them together to form a single object, and the eyes are therefore examined while they are in a state of rest.

Figure 16:
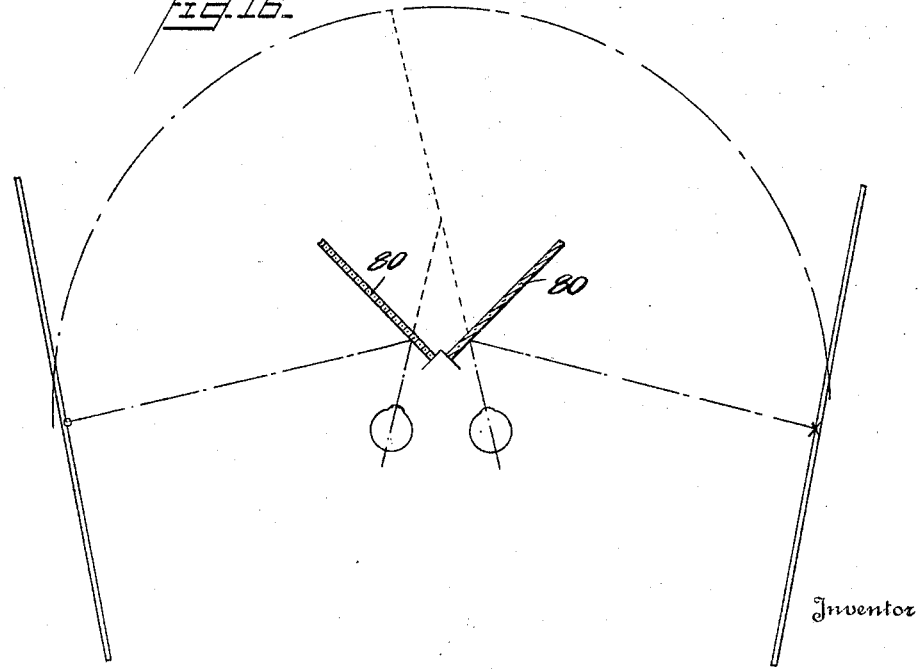
Fig. 16 is a similar view, showing the relation of the same patient's eyes to the apparatus after the adjustments necessary to secure binocular vision have been made.

As above stated, if the patient's eyes are emmetropic and orthophoric, the two dissimilar objects on the cards 156 and 157 will be seen as a single composite image in the form of a cross when the apparatus is in the position shown in Figure 13 and the cards are in their normal positions above defined. If the patient has esophoria, which is a condition where the visual axes of the eyes tend to deviate inwards, it will be necessary to move the arms 121 forward in order to form a composite image. This condition is illustrated in Figures 15 and 16. If the visual axes of the patient's eyes tend to deviate outwards, as do the exophoric eyes shown diagrammatically in Figures 17 and 18, it will be necessary to move the arms 121 backward in order to obtain binocular vision. In each case the necessary prism correction, and consequently the amount of the esophoria or exophoria, may be read directly off either dial 125 in terms of the units now in use by oculists. This test will tell the nature and amount of the muscular defect, but will not reveal which eye is at fault.

Similarly, hyperphoric or hypophoric eyes may be corrected for so as to secure binocular vision by tilting or oscillating the arms 121, or rather the member 100 to which they are connected, about the pivot pin 101. Hyperphoria is a tendency of one eye to deviate upward, and hypophoria is a tendency of one eye to deviate downward. The amount of the defect will be indicated on dial 127, but again, this test will not tell which eye is at fault. Thus a movement of the charts downward to the left would indicate either hyperphoria of the right eye or hypophoria of the left eye.

It may happen that the patient sees the objects on the cards 156 and 157 superposed so as to form a composite image with a common center but not in the form of a cross. That is, the line 160 on the card 157 may appear at an oblique angle to the head of the T 158 on the card 156. In this case, one or both of the cards should be rotated about their horizontal axes until the patient sees a perfect vertically disposed cross. The extent of the rotation required to achieve this condition will indicate the amount of cyclophoria with which the patient is afflicted, cyclophoria being an insufficiency of the oblique muscle. This is called testing the vertical declination of the patient's eyes. The instrument ordinarily used to make this test is called a clinoscope, and it will be seen that my improved eye testing apparatus will perform the functions of this instrument as well as those of a phorometer or muscle tester.

Having thus determined the nature and amount of the patient's muscular defects, the eye which is at fault in each instance may be readily determined by the usual simple tests well known to oculists. It should be borne in mind that it has been assumed throughout the above discussion that the patient's eyes are emmetropic, that is, that each eye, separate from its fellow, when in a state of rest, will receive parallel rays of light exactly at a focus upon its fovea. If this is not the case, the patient should wear a trial frame containing glasses which will overcome his ametropia.

My apparatus can also be used for making field tests and perimeter tests. In making these tests, the chart 165 shown in Figures 7 and 8 is employed. This chart is simply a square card on the front of which are drawn the vertical and horizontal axes and the diagonals. From the center formed by the intersection of these lines, a plurality of concentric circles are drawn at intervals of, say, 5°, 10°, 20°, 30°, 40°, and 50°, respectively. The diameters of the concentric circles are determined by the distance at which the chart is to be used. For example, if the chart is to be used at a distance of seven inches from the patient's eyes, the 45° circle would be seven inches in radius. The light ray from any point on this circle to the patient's eye would then make an angle of 45° with the light ray from the center of the circle to his eye. On the back of the card are drawn a number of spaced cross marks, located along the vertical center line of the chart, and each spaced from the center mark a distance equal to the diameter of one of the circles on the face of the chart. The chart may also be supplied with small ellipses at approximately 15° on either side of the vertical axis, if desired, to indicate the approximate location of the blind spots. Because the two charts are placed facing each other and the light rays therefrom reflected into the patient's eyes by the mirrors 80, the charts do not in any way interfere with each other, and they may be made as large as desired. This is a decided advantage over existing types of binocular instruments for making field tests, perimeter tests, and the like, in which the charts are mounted side by side.

In making a perimeter test, two of these cards 165 are placed on one pair of sleeves 130 and the apparatus adjusted by moving the arms 121 forward or backward and upward or downward until the patient sees both charts as a single composite image. The observer may then make the perimeter test in the usual manner, using a small colored test disk which is moved over the face of the chart, and recording on the chart the most extreme outward positions in which the patient can see the disk.

In making the field test, the front of one chart 165 will be used and the back of the other, depending upon which eye it is desired to test. The cross marks on the back of the chart, shown in Figure 8, are used to obtain binocular fixation when the arms 121 are tilted in studying the upper or lower fields. That is, the eye not being examined will be focused upon the cross line which is in the same horizontal plane as the center of the other chart, as an aid in maintaining fixation. The mirror box may be rotated to study the nasal or temporal fields. By rotating the mirror box from the eye being examined, a large temporal field will be obtained, and by rotating it toward the eye being examined the nasal field is enlarged. To lower the chart from the eye being examined enlarges the upper field, and vice versa. This is true because the nasal field of the eye is projected on the temporal field of the retina and the upper field of the eye projected upon the lower field of the retina, and vice versa.

Although I have described the use of my apparatus in connection with certain specific tests, it will be obvious that it is by no means limited thereto but may be used to perform a great variety of eye tests. The six possible adjustments of my device, namely, the forward or backward movement of the mirror box, the forward or backward movement of the arms 121, the tilting of the arms 121 about a horizontal axis, the rotation of the mirror box, the inward or outward movement of the charts, and the rotation of the charts about a horizontal axis, make my apparatus extremely versatile. Not all of these adjustments are necessary for some tests, but they are all called into service at one time or another, and they greatly extend the field of utility of the apparatus.

It will be obvious to one skilled in the art that more accurate results may be obtained by using my apparatus and making all the necessary corrections at one reading, than by using separate instruments for each test, as is now usually done. The reason for this is that with my apparatus the patient's eyes are in a state of rest, whereas with prior types of apparatus with which tests for only a single defect are made at a time, the presence of other uncorrected defects may cause an involuntary adjustment of the patient's eyes which destroys the accuracy of the reading. For example, in testing a patient afflicted with both cyclophoria and esophoria with an ordinary clinoscope, the readings of the clinoscope may be affected by the muscular strain upon the patient's eyes necessary to overcome his esophoria. With my apparatus, on the other hand, a correction is made for each defect, and the eyes are examined in a perfect state of rest.

Many alterations or modifications might be made in the structure above described without affecting the spirit of my invention, and my invention therefore includes all such changes which fall within the scope of the appended claims.

Having thus described the invention what is claimed as new and desired to be secured by Letters Patent is:

1. An eye testing apparatus, comprising in combination, a pair of test charts, a plurality of mirrors adapted to reflect light rays from said charts into a pair of eyes so that each eye sees only one of said charts, and means for adjusting the relative positions of said charts and mirrors so that a single binocular image in stereo relief is seen, and means for indicating the extent of such adjustment with respect to a predetermined relative position.

2. An eye testing apparatus, comprising in combination, a plurality of mirrors adapted to be positioned adjacent the eyes to be tested, a pair of test charts adapted to cooperate with said mirrors so that each eye sees only one of said charts, and means for adjusting the relative positions of said charts and mirrors so that a light ray from the center of each chart perpendicular thereto will be reflected into the center of the corresponding eye, and means for measuring the extent of such adjustment with respect to a normal position.

3. An eye testing apparatus, comprising in combination, a pair of test charts, a plurality of mirrors adapted to reflect light rays from said charts into a pair of eyes so that each eye sees only one of said charts, and means for oscillating said charts about an axis equidistant therefrom so that the charts are always on diametrically opposite sides of said axis.

4. An eye testing apparatus, comprising in combination, a pair of test charts, a plurality of mirrors adapted to reflect light rays from said charts into a pair of eyes so that each eye sees only one of said charts, and means for moving said charts angularly toward or from each other so that they are always tangent to the surface of a right circular cylinder whose axis is parallel to the planes of the charts and equidistant therefrom.

5. An eye testing apparatus, comprising in combination, a pair of test charts, a plurality of mirrors adapted to reflect light rays from said charts into a pair of eyes so that each eye sees only one of said charts, means for oscillating said charts about a fixed axis equidistant therefrom so that the charts are always on diametrically opposite sides of said fixed axis, and means for moving said charts toward or from each other so that they are always tangent to the surface of a right circular cylinder whose axis is parallel to the planes of the charts and perpendicular to said fixed axis.

6. An eye testing apparatus, comprising in combination, a pair of test charts, a plurality of mirrors adapted to reflect light rays from said charts into a pair of eyes so that each eye sees only one of said charts, means for oscillating said charts about an axis equidistant therefrom so that the charts are always on diametrically opposite sides of said axis, and means for moving said mirrors in a direction parallel to said axis.

7. An eye testing apparatus, comprising in combination, a pair of test charts, a plurality of mirrors adapted to reflect light rays from said charts into a pair of eyes so that each eye sees only one of said charts, means for moving said charts arcuately toward or from each other so that they are always tangent to the surface of a right circular cylinder whose axis is parallel to the planes of the charts and equidistant therefrom, and means for moving said mirrors toward or from the axis of said cylinder.

8. An eye testing apparatus, comprising in combination, a pair of test charts, a plurality of mirrors adapted to reflect light rays from said charts into a pair of eyes so that each eye sees only one of said charts, means for oscillating said charts about a fixed axis equidistant therefrom so that the charts are always on diametrically opposite sides of said fixed axis, means for moving said charts toward or from each other so that they are always tangent to the surface of a right circular cylinder whose axis is parallel to the planes of the charts and perpendicular to said fixed axis, and means for moving said mirrors in a direction parallel to said fixed axis.

9. An eye testing apparatus, comprising in combination, a pair of test charts, a plurality of mirrors adapted to reflect light rays from said charts into a pair of eyes so that each eye sees only one of said charts, means for oscillating said charts about a fixed axis equidistant therefrom so that the charts are always on diametrically opposite sides of said fixed axis, means for moving said charts toward or from each other so that they are always tangent to the surface of a right circular cylinder whose axis is parallel to the planes of the charts and perpendicular to said fixed axis, means for moving said mirrors in a direction parallel to said fixed axis, and means for rotating each of said charts about an axis perpendicular to its plane.

10. An eye testing apparatus, comprising in combination, a pair of test charts, a pair of mirrors mounted at an angle to each other and adapted to reflect light rays from said charts into a pair of eyes so that each eye sees only one of said charts, means for moving said charts toward or from each other so that they are always tangent to the surface of a right circular cylinder whose axis is parallel to the planes of the charts and equidistant therefrom, and means for moving said charts about a second axis perpendicular to the axis of said imaginary cylinder in such manner as to tilt the axis of said cylinder with respect to the mirrors without changing the angular relationship of said charts.

11. An eye testing apparatus, comprising in combination, a pair of test charts, a pair of mirrors mounted at an angle to each other and adapted to reflect light rays from said charts into a pair of eyes so that each eye sees only one of said charts, means for moving said charts toward or from each other so that they are always tangent to the surface of a right circular cylinder whose axis is parallel to the planes of the charts and equidistant therefrom, means for moving said charts about a second axis perpendicular to the axis of said imaginary cylinder in such manner as to tilt the axis of said cylinder with respect to the mirrors without changing the angular relationship of said charts, and means for moving said mirrors in a direction parallel to said second axis.

12. An eye testing apparatus, comprising in combination, a pair of test charts, a pair of mirrors mounted at an angle to each other and adapted to reflect light rays from said charts into a pair of eyes so that each eye sees only one of said charts, means for moving said charts toward or from each other so that they are always tangent to the surface of a right circular cylinder whose axis is parallel to the planes of the charts and equidistant therefrom, means for moving said charts about a second axis perpendicular to the axis of said imaginary cylinder in such manner as to tilt the axis of said cylinder with respect to the mirrors without changing the angular relationship of said charts, means for moving said mirrors in a direction parallel to said second axis, and means for rotating each of said charts about an axis through its center and perpendicular to its plane.

13. An eye testing apparatus, comprising in combination, a pair of test charts, a pair of mirrors mounted at an angle to each other and adapted to reflect light rays from said charts into a pair of eyes so that each eye sees only one of said charts, means for moving said charts toward or from each other so that they are always tangent to the surface of a right circular cylinder whose axis is parallel to the planes of the charts and equidistant therefrom, means for moving said charts about a second axis perpendicular to the axis of said imaginary cylinder in such manner as to tilt the axis of said cylinder with respect to the mirrors without changing the angular relationship of said charts, means for moving said mirrors in a direction parallel to said second axis, and means for rotating said mirrors about an axis parallel to their line of intersection and equidistant from each mirror.

14. An eye testing apparatus, comprising in combination, a pair of test charts, a pair of mirrors mounted at an angle to each other and adapted to reflect light rays from said charts into a pair of eyes so that each eye sees only one of said charts, means for moving said charts in a vertical direction in such manner that they are always tangent at their centers to the surface of a sphere whose center is the intersection of a pair of lines passing through the center of each chart and perpendicular thereto, when said charts are in a non-parallel position, and means for moving said mirrors in a direction perpendicular to their line of intersection.

15. An eye testing apparatus, comprising in combination, a pair of test charts, a pair of mirrors mounted at an angle to each other and adapted to reflect light rays from said charts into a pair of eyes so that each eye sees only one of said charts, means for moving said charts in a vertical direction in such manner that they are always tangent at their centers to the surface of a sphere whose center is the mid-point of a line connecting the centers of the charts and perpendicular to each chart, means for moving said mirrors in a direction perpendicular to their line of intersection, and means for rotating each of said charts about an axis through its center and perpendicular to its plane.

16. An eye testing apparatus, comprising in combination, a pair of test charts, a pair of mirrors mounted at an angle to each other and adapted to reflect light rays from said charts into a pair of eyes so that each eye sees only one of said charts, means for moving said charts in a vertical direction in such manner that they are always tangent at their centers to the surface of a sphere whose center is the mid-point of a line connecting the centers of the charts and perpendicular to each chart, means for moving said mirrors in a direction perpendicular to their line of intersection, and means for rotating said mirrors about an axis parallel to their line of intersection and equidistant from each mirror.

17. An eye testing apparatus, comprising in combination, a pair of test charts, a pair of vertical mirrors mounted at an angle to each other adapted to reflect light rays from said charts into a pair of eyes so that each eye sees only one of said charts, means for oscillating said charts about a fixed horizontal axis so that they are always on diametrically opposite sides thereof, and means for moving said charts about a second axis parallel to the planes of said charts and perpendicular to said horizontal axis so that the angle between the charts is varied.

18. An eye testing apparatus, comprising in combination, a pair of test charts, a pair of vertical mirrors mounted at an angle to each other and adapted to reflect light rays from said charts into a pair of eyes so that each eye sees only one of said charts, means for oscillating said charts about a fixed horizontal axis so that they are always on diametrically opposite sides thereof, means for moving said charts about a second axis parallel to the planes of said charts and perpendicular to said horizontal axis so that the angle between the charts is varied, and means for moving said mirrors in a direction parallel to said fixed axis.

19. An eye testing apparatus, comprising in combination, a pair of test charts, a pair of vertical mirrors mounted at an angle to each other and adapted to reflect light rays from said charts into a pair of eyes so that each eye sees only one of said charts, means for oscillating said charts about a fixed horizontal axis so that they are always on diametrically opposite sides thereof, means for moving said charts about a second axis parallel to the planes of said charts and perpendicular to said horizontal axis so that the angle between the charts is varied, means for moving said mirrors in a direction parallel to said fixed axis, and means for rotating each of said charts about an axis through its center and perpendicular to its plane.

20. An eye testing apparatus, comprising in combination, a pair of test charts, a pair of vertical mirrors mounted at an angle to each other and adapted to reflect light rays from said charts into a pair of eyes so that each eye sees only one of said charts, means for oscillating said charts about a fixed horizontal axis so that they are always on diametrically opposite sides thereof, means for moving said charts about a second axis parallel to the planes of said charts and perpendicular to said horizontal axis so that the angle between the charts is varied, means for moving said mirrors in a direction parallel to said fixed axis, and means for rotating said mirrors about a vertical axis between the same and equidistant therefrom, said mirrors being so positioned that their axis of rotation intersects said fixed horizontal axis.

21. An eye testing apparatus, comprising in combination, a pair of test charts, a plurality of mirrors adapted to reflect light rays from said charts into a pair of eyes so that each eye sees only one of said charts, a supporting arm for each of said test charts and normally in alignment and a pivotal connection between said arms.

22. An eye testing apparatus, comprising in combination, a pair of normally diagonally opposite test charts, a plurality of mirrors adapted to reflect light rays from said charts into a pair of eyes so that each eye sees only one of said charts, a supporting arm for each of said test charts, and means for oscillating said arms about a common axis parallel to their plane.

23. An eye testing apparatus, comprising in combination, a pair of normally diagonally opposite test charts, a pluarlity of mirrors adapted to reflect light rays from said sharts into a pair of eyes so that each eye sees only one of said charts, a supporting arm for each of said test charts, a pivotal connection between said arms, and means for oscillating said pivotal connection about an axis perpendicular to the axis of the pivotal connection.

24. An eye testing apparatus, comprising in combination, a pair of test charts, a plurality of mirrors adapted to reflect light rays from said charts into a pair of eyes so that each eye sees only one of said charts, a supporting arm for each of said test charts, a pivotal connection between said arms, means for oscillating said pivotal connection about an axis perpendicular to the axis of the pivotal connection, and means for moving said mirrors in a direction parallel to the axis about which the pivotal connection rotates.

25. An eye testing apparatus, comprising in combination, a pair of test charts, a plurality of mirrors adapted to reflect light rays from said charts into a pair of eyes so that each eye sees only one of said charts, a supporting arm for each of said test charts, a pivotal connection between said arms, means for oscillating said pivotal connection about an axis perpendicular to the axis of the pivotal connection, means for moving said mirrors in a direction parallel to the axis about which the pivotal connection rotates, and means for rotating each of said charts about an axis through its center and perpendicular to its plane.

26. An eye testing apparatus, comprising in combination, a pair of test charts, a plurality of mirrors adapted to reflect light rays from said charts into a pair of eyes so that each eye sees only one of said charts, a supporting arm for each of said test charts, a pivotal connection between said arms, means for oscillating said pivotal connection about an axis perpendicular to the axis of the pivotal connection, means for moving said mirrors in a direction parallel to the axis about which the pivotal connection rotates, and means for rotating said mirrors about an axis parallel to their line of intersection and equidistant from each mirror.

27. An eye testing apparatus, comprising in combination, a pair of test charts, a pair of vertical mirrors mounted at an angle to each other and adapted to reflect light rays from said charts into a pair of eyes so that each eye sees only one of said charts, a supporting arm for each of said test charts perpendicular to the plane thereof, and means for rotating said arms about an axis perpendicular to the plane of the arms.

28. An eye testing apparatus, comprising in combination, a pair of test charts, a pair of vertical mirrors mounted at an angle to each other and adapted to reflect light rays from said charts into a pair of eyes so that each eye sees only one of said charts, a supporting arm for each of said test charts perpendicular to the plane thereof, means for rotating said arms about an axis perpendicular to the plane of the arms, and means for oscillating said arms about a horizontal axis perpendicular to the axis of rotation of the arms.

29. An eye testing apparatus, comprising in combination, a pair of test charts, a pair of vertical mirrors mounted at an angle to each other and adapted to reflect light rays from said charts into a pair of eyes so that each eye sees only one of said charts, a supporting arm for each of said test charts perpendicular to the plane thereof, means for rotating said arms about an axis perpendicular to the plane of the arms, means for oscillating said arms about a horizontal axis perpendicular to the axis of rotation of the arms, and means for moving said mirrors in a direction perpendicular to their line of intersection.

30. An eye testing apparatus, comprising in combination, a pair of test charts, a pair of vertical mirrors mounted at a angle to each other and adapted to reflect light rays from said charts into a pair of eyes so that each eye sees only one of said charts, a supporting arm for each of said test charts perpendicular to the plane thereof, means for rotating said arms about an axis perpendicular to the plane of the arms, means for oscillating said arms about a horizontal axis perpendicular to the axis of rotation of the arms, means for moving said mirrors in a direction perpendicular to their line of intersection, and means for rotating each of said charts about an axis through its center and perpendicular to its plane.

31. An eye testing apparatus, comprising in combination, a pair of test charts, a pair of vertical mirrors mounted at an angle to each other and adapted to reflect light rays from said charts into a pair of eyes so that each eye sees only one of said charts, a supporting arm for each of said test charts perpendicular to the plane thereof, means for rotating said arms about an axis perpendicular to the plane of the arms, means for oscillating said arms about a horizontal axis perpendicular to the axis of rotation of the arms, means for moving said mirrors in a direction perpendicular to their line of intersection, and means for rotating said mirrors about an axis parallel to their line of intersection and equidistant from each mirror.

32. An eye testing apparatus comprising in combination, a pair of test charts, a pair of mirrors mounted at an acute angle to each other and adapted to reflect light rays from said chart into a pair of eyes so that each eye sees only one of said charts, means for adjusting said charts to correct and indicate any vertical declination of said eyes, and further means of adjustment to correct and indicate any horizontal deviation thereof while the vertical declination is corrected, whereby the amount indicated is unaffected by the vertical deviation.

In testimony whereof I hereunto affix my signature.

WILLIAM PERRY REAVES.